(12) United States Patent
Romanenko

(10) Patent No.: US 11,055,824 B2
(45) Date of Patent: Jul. 6, 2021

(54) HYBRID MACHINE LEARNING SYSTEMS

(71) Applicant: Apical Limited, Cambridge (GB)

(72) Inventor: Ilya Romanenko, Loughborough (GB)

(73) Assignee: Apical Limited, Cambridge (GB)

( * ) Notice: Subject to any disclaimer, the term of this patent is extended or adjusted under 35 U.S.C. 154(b) by 96 days.

(21) Appl. No.: 15/866,889

(22) Filed: Jan. 10, 2018

(65) Prior Publication Data

US 2018/0130186 A1 May 10, 2018

Related U.S. Application Data

(63) Continuation of application No. PCT/EP2016/066698, filed on Jul. 13, 2016.

(30) Foreign Application Priority Data

Jul. 14, 2015 (GB) ...................................... 1512278

(51) Int. Cl.
*G06K 9/46* (2006.01)
*G06K 9/00* (2006.01)
(Continued)

(52) U.S. Cl.
CPC .......... *G06T 5/002* (2013.01); *G06K 9/00288* (2013.01); *G06K 9/4609* (2013.01);
(Continued)

(58) Field of Classification Search
None
See application file for complete search history.

(56) References Cited

U.S. PATENT DOCUMENTS 5,825,936 A * 10/1998 Clarke .................. G06T 7/0012
382/261
6,038,337 A 3/2000 Lawrence et al.
(Continued)

FOREIGN PATENT DOCUMENTS

EP 1246121 A2 10/2002
GB 1422787 A 1/1976
(Continued)

OTHER PUBLICATIONS

Senthilnath, J., et al. "An approach to multi-temporal MODIS image analysis using image classification and segmentation." Advances in Space Research 50.9 (2012): 1274-1287. (Year: 2012).*
(Continued)

*Primary Examiner* — Vu Le
*Assistant Examiner* — Tracy Mangialaschi
(74) *Attorney, Agent, or Firm* — EIP US LLP

(57) ABSTRACT

A machine learning system for processing image data obtained from an image sensor is provided. The system includes a front end comprising one or more hard-coded filters, each of the one or more hard-coded filters being arranged to perform a set task. The system includes a neural network arranged to receive and process output from the front end. The one or more hard-coded filters include one or more hard-coded noise compensation filters that are hard-coded to compensate for a noise profile of the image sensor from which the image data is obtained. A method of processing image data in a machine learning system is also provided. A system for processing image data is provided.

19 Claims, 9 Drawing Sheets

(51) Int. Cl.
*G06N 3/04* (2006.01)
*G06T 5/00* (2006.01)
*G06K 9/62* (2006.01)
*G06T 7/44* (2017.01)
*G06T 7/10* (2017.01)

(52) U.S. Cl.
CPC ......... *G06K 9/4628* (2013.01); *G06K 9/4652* (2013.01); *G06K 9/627* (2013.01); *G06K 9/6286* (2013.01); *G06K 9/6288* (2013.01); *G06T 7/10* (2017.01); *G06T 7/44* (2017.01); *G06N 3/0454* (2013.01); *G06T 2207/20081* (2013.01); *G06T 2207/20084* (2013.01)

(56) References Cited

U.S. PATENT DOCUMENTS

| | | | |
|---|---|---|---|
| 6,816,611 B1* | 11/2004 | Hagiwara | G06K 9/4647 340/5.53 |
| 2005/0201591 A1 | 9/2005 | Kiselewich | |
| 2006/0228027 A1* | 10/2006 | Matsugu | G06K 9/00281 382/181 |
| 2008/0056606 A1 | 3/2008 | Kilgore | |
| 2008/0137946 A1* | 6/2008 | Choe | G06T 5/002 382/167 |
| 2008/0267530 A1* | 10/2008 | Lim | G06T 5/002 382/284 |
| 2014/0064609 A1* | 3/2014 | Petre | G06K 9/6232 382/159 |
| 2015/0067008 A1* | 3/2015 | Kamath | G06F 17/18 708/202 |
| 2015/0347860 A1* | 12/2015 | Meier | G06K 9/3241 382/140 |

FOREIGN PATENT DOCUMENTS

| | | |
|---|---|---|
| WO | 2007033101 A2 | 3/2007 |
| WO | 2013106074 A1 | 7/2013 |
| WO | 2016097758 A1 | 6/2016 |
| WO | 2017009396 A1 | 1/2017 |

OTHER PUBLICATIONS

Wang, Zhou, and David Zhang. "Progressive switching median filter for the removal of impulse noise from highly corrupted images." IEEE Transactions on Circuits and Systems II: Analog and Digital Signal Processing 46.1 (1999): 78-80. (Year: 1999).*
Sharma, Rahul, and Manish Shrivastav. "An Offline Signature Verification System Using Neural Network Based on Angle Feature and Energy Density." International Journal on Emerging Technologies 2.2 (2011): 84-89. (Year: 2011).*
Sharma, Ankit, and Dipti R. Chaudhary. "Character recognition using neural network." International journal of engineering Trends and Technology (IJETT) 4.4 (2013): 662-667. (Year: 2013).*
Shah Rizam, M. S. B., et al. "Non-destructive watermelon ripeness determination using image processing and artificial neural network (ANN)." International Journal of Electrical and Computer Engineering 4.6 (2009). (Year: 2009).*
Shams, M. Y., et al. "Iris recognition based on LBP and combined LVQ classifier." arXiv preprint arXiv:1111.1562 (2011). (Year: 2011).*
International Search Report dated Oct. 14, 2016 for PCT Application No. PCT/EP2016/066698.
""Proceedings of the International Congress on Computational Intelligence", 2003, Caldrón et al, Handwritten Digit Recognition using Convolutional Neural Networks and Gabor filters (GCNN) available from http://citeseerx.ist.psu.edu/viewdoc/download?doi=10.1.1.133.6559&rep=rep1&type=pdf [accessed Jan. 2, 2016]."
""Proceedings of the 6th International Conference on Soft Computing and Pattern Recognition", SoCPaR, 2014, IEEE, pp. 17-14, Chelali et al, "Face recognition system using neural network with Gabor and discrete wavelet transform parameterization" doi: 10.1109/SOCPAR.2014.7007975(Chelali)."
"AL-Allaf, "Review of Face Detection Systems Based Artificial Networks Algorithms", 2014, arXiv.org, available on http://arxiv.org/abs/1404.1292 [accessed Feb. 3, 2016](AL-Allaf)."

* cited by examiner

US 11,055,824 B2

HYBRID MACHINE LEARNING SYSTEMS

CROSS-REFERENCE TO RELATED APPLICATIONS

This application is a continuation of International Application No. PCT/EP2016/066698, filed Jul. 13, 2016, which claims priority to UK patent application no. 1512278.1, filed Jul. 14, 2015, under 35 U.S.C. § 119(a). Each of the above-referenced patent applications is incorporated by reference in its entirety.

TECHNICAL FIELD

The present disclosure relates to hybrid machine learning systems and associated methods and computer software.

BACKGROUND

Machine learning concerns the ability of a machine, such as a computer, to learn without being explicitly programmed. An artificial neural network (ANN) is a network model inspired by biological neural networks that may be used in machine learning. In ANN, a set of nodes, called neurons, are connected together to form the ANN. A convolutional neural network (CNN) is a type of feed-forward ANN where individual neurons are tiled in such a way that they can respond to overlapping regions in a visual field. When used for image recognition, known CNNs have multiple layers of small neuron collections which look at small portions of an input image, called receptive fields. The results of these collections are then tiled so that they overlap to obtain a better representation of the original image. This is repeated for every such layer. The layers form a hierarchical system in which the first layers look for lower-level features. This is accomplished by means of convolution between a convolutional kernel and an image. Subsequent layers look for higher-level features.

While there are benefits to using ANNs, and in particular CNNs, in machine learning systems, they can introduce limitations or other considerations. For example, the training phase for a CNN may be undesirably time-consuming and/or computationally intensive. Another limitation is the complexity of a CNN in terms of the amount of calculations and the associated size of network configuration data. Both of these limitations make practical use of ANNs difficult and constrained in many aspects.

It would be desirable to provide improved machine learning systems.

SUMMARY

According to some embodiments, a machine learning system for processing image data obtained from an image sensor is provided. The system includes a front end comprising one or more hard-coded filters, each of the one or more hard-coded filters being arranged to perform a set task. The system includes a neural network arranged to receive and process output from the front end. The one or more hard-coded filters include one or more hard-coded noise compensation filters that are hard-coded to compensate for a noise profile of the image sensor from which the image data is obtained.

According to some other embodiments, a method of processing image data in a machine learning system is provided. The method includes processing, in a front end of the machine learning system, image data obtained from an image sensor, the front end comprising one or more hard-coded filters, each of the one or more hard-coded filters being arranged to perform a set task. The method includes receiving and processing output from the front end in a neural network part of the machine learning system. The one or more hard-coded filters include a hard-coded noise compensation filter that is hard-coded to compensate for a noise profile of the image sensor from which the image data is obtained.

According to yet other embodiments, a system for processing image data is provided. The system includes a front end comprising one or more hard-coded filters adapted to compensate for sensor noise associated with one or more image sensors from which the image data is obtained. The system includes a back end comprising one or more neural networks adapted to receive and process output from the front end.

Further features and advantages will become apparent from the following description, given by way of example only, which is made with reference to the accompanying drawings.

DETAILED DESCRIPTION

Figure 1:
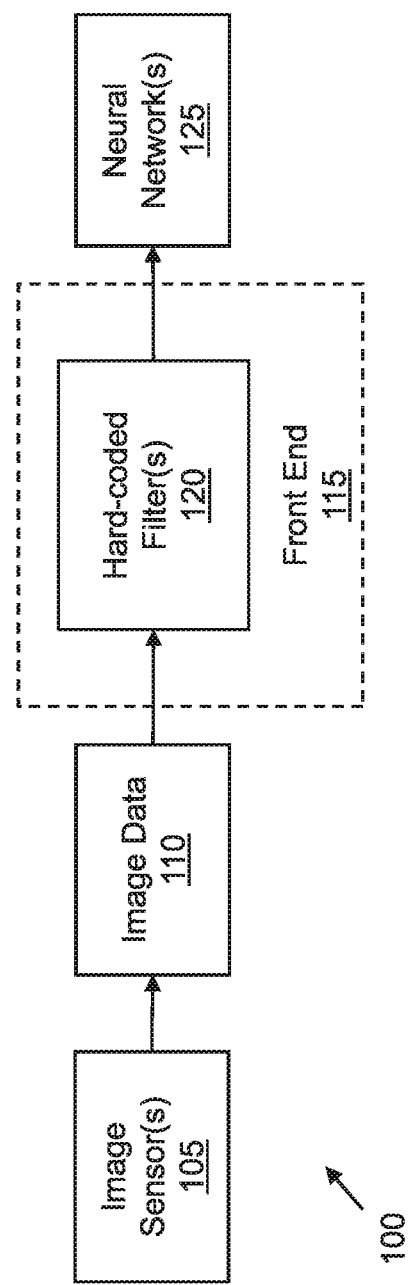
FIG. 1 shows a schematic block diagram of an example of hybrid machine learning system, in accordance with some example embodiments.

Before describing various examples of hybrid machine learning systems in accordance with embodiments of the present disclosure, a further explanation of machine learning systems will now be provided.

Some known machine learning systems focus on hierarchical feature extraction and classification. Classification concerns identifying to which of a set of categories (or 'sub-populations') a new observation belongs, on the basis of a training set of data containing observations (or 'instances') whose category membership is known. The individual observations are analysed into a set of quantifiable properties, known as 'explanatory variables' or 'features'. An algorithm that implements classification may be known as a classifier.

In some known machine learning systems, algorithms operate at a low level to detect specific features in a raw image. Examples of such features include edges and corners for example. Then, at higher levels, more complex, or higher-level, features are detected based on the features identified at the lower levels. Trained classifiers are then applied to identify categories to which the detected, complex features belong.

Filters may be designed by an engineer in a process known as 'hand-crafting' or 'hard-coding'. A hard-coded filter is one whose values are set or fixed so that the filter performs a set task. The values of the hard-coded filter are not changed through an iterative learning or training process.

For example, lower-level filters may be designed to detect corners and/or edges for example. Higher-level filters may also be designed to identify edges that are joined together with right-angled corners. A recognizer may be built using these engineered filters. Raw image data may be sent to and processed by the recognizer such that feature extraction at the lower level operates to identify corners and edges in an image and, at the higher level, a feature extraction operation identifies edges that are joined together with right-angled corners. A classifier may then activate for the presence of a square object for example. The feature-engineering phase during which an engineer manually creates the set of features to be detected may, however, be complex and time-consuming.

Deep learning stands in contrast to the hand-crafted feature and classification approach. The advent of deep-learning techniques in the late 2000s has advanced earlier work in ANNs. Deep learning, particularly CNNs, has now become a dominant and effective force in machine learning. CNNs involve training a system on raw data with a large number of examples based on the objects that the system is set up to search for or identify. Features are not predefined in CNNs. Instead, CNNs self-learn features during a training phase. As such, there is no need to initially consider or define what the best features are in conventional CNNs as these are learned during the training phase, unlike the hard-coded feature extraction systems described above in which the values of filters are not learned during a training phase.

CNNs use convolutional kernels, which are also known as kernels, convolution matrices, and masks. A convolutional kernel is a small matrix useful for blurring, sharpening, embossing, edge-detection, etc. This is accomplished by means of convolution between a convolutional kernel and an image. The values of a given pixel in the output image are calculated by multiplying each value in the convolutional kernel by the corresponding input image pixel value and summing the results.

A human may, for example, classify an image of an animal by recognizing features of the animal such as the number of limbs, the texture of the skin (for example whether it is furry, feathered, scaled, etc.), the size of the animal, etc. A single-layer ANN, however, would need to learn a function that outputs a label, to classify an animal in an image, solely using the intensity of the pixels in the image. A single-layer ANN cannot learn any abstract features of the input data since it is limited to having only one layer. A multi-layered ANN can, however, create internal representations and learn different features in each of its multiple layers. The first layer may, for example, be responsible for learning the orientations of lines in images using the inputs from the individual pixels in the image. The second layer may, for example, combine the features learned in the first layer and learn to identify simple shapes such as circles. Each higher layer learns more abstract features, for example the number of limbs, skin texture etc, that can then be used to classify the image. Each layer finds patterns in the layer below it. This ability to create internal representations that are independent of outside input gives multi-layered ANNs their power.

ANNs use a backpropagation algorithm to train the network. The goal and motivation for developing the backpropagation algorithm was to find a way to train a multi-layered ANN such that it can learn the appropriate internal representations to allow it to learn any arbitrary mapping of input to output.

As indicated above, CNNs require a training phase. During the training phase, a CNN is shown a large number, for example millions, of raw images as inputs. The parameters applied to the convolutional kernels across all layers (or 'stacked layers'), are gradually adjusted through an automated process during the training phase until the desired output is consistently achieved. There may be for example 10-30 stacked layers of such convolutional kernels. For example, if the CNN is designed to recognize a cat, then the CNN is shown millions of images of cats and non-cats and the parameters for the convolutional kernels across all stacked layers are altered until the CNN can reliably identify images with cats. After training, the layers form a hierarchical system in which the first layers look for lower level features, such as edges and corners, higher levels look for overall shapes formed by the edges and corners, and the highest levels activate only when complex and specific objects the CNN has been trained to detect, in this example cats, are present in the image.

CNNs suffer from a number of problems, including a multi-scale problem, lack of flexibility and difficulty of fast-learning.

In terms of the multi-scale problem in known CNNs, one challenging problem is to be able to recognize an object irrespective of its scale, as the convolution layer in a CNN has some difficulty identifying objects that vary greatly in size across different images containing the objects. This is mainly because the convolutional layer has kernels, or filters, with a specific size. At the same time, using a CNN on a multiple scales of an image and evaluation of a large number of region proposals on each scale, would increase the complexity of a system by several orders of magnitude, making practical use of CNN for object detection in a real-time systems impossible. As an example, if a 5×5 convolutional kernel is applied to an image to detect an object of a size of 224×224 pixels, the output of a convolutional filter will adequately encode image features, describing important object features. If the same object is captured by camera with four times the resolution, or captured at half the distance, the object will be represented by a pixel array of 448×448 resolution. Applying the same 5×5 kernel may result in a noisy response, which will contain image features as well as noise and non-significant image details, which will be too fine to describe salient object features. Therefore, depending on the size of the kernel, the output may be unusable. Applying significantly larger kernels in a CNN is problematic owing largely to increased system complexity and therefore greatly increased training efforts. Hence, it would be desirable to enhance a CNN so that it could identify objects that cover at least a ten times variation in size. It would then be possible to classify the same object whether it is big or small, far away or close up. A known approach developed by University of California, Berkeley includes adding a number of layers, for example five layers, after the convolution kernels stage in a CNN to analyse objects of different scales. The approach involves calculating spatial dependencies between the feature responses and increases the size of the CNN.

In terms of lack of flexibility in known CNNs, each convolutional kernel activates in response to a specific feature. It can be difficult to understand exactly what those features are, especially higher up in the CNN hierarchy where layers activate to more abstract, higher-level features. One known way to address this is to increase the number of layers. In doing so, the CNN will, at least in theory, have more layers, each being able to activate in response to different features, again at least in theory. Overall, a CNN having more layers would be more flexible in the sense of being able to activate to a larger number of objects, for example not only cats, but also dogs, horses, people, cars, etc. However, adding further layers can add greatly to the complexity of the CNN. For CNNs that are cloud-implemented, complexity may be less of an issue. However, it may be a serious barrier to implementing a CNN in a hardware device such as a Graphics Processing Unit (GPU) or System on Chip (SoC), particularly where that hardware device operates in a power-constrained product, such as a smartphone.

In terms of the difficulty of fast learning in known CNNs, a CNN can be trained to detect and classify many different objects, for example up to 1000 classes or objects. However, learning each new object or class involves supplying a sufficiently large training set so that the CNN can detect that particular object or class. Such CNN training may require significant time to learn a new object. Full training of a CNN may take several days on a high-performance computational cluster for example. This feature of known CNNs means that known CNNs are not well-suited to online learning functionality in which a mobile device learns a new object by simple exposure to that object and a clear annotation of an object.

In summary, feature engineering is the process of using domain knowledge of the raw data to be recognized and classified to manually create features that make machine learning algorithms work better. One of the perceived strengths of deep-learning systems is the absence of any feature engineering. Instead, deep-learning systems are conventionally wholly self-learning, with feature learning and hierarchical feature extraction arising automatically as raw data is ingested and processed from the input to the output layers of the deep-learning system. Feature extraction and/or classification based on hand-crafted filters on the one hand and deep-learning on the other hand have been seen as separate and distinct approaches to delivering effective machine learning, for example for use in computer vision.

As indicated above, in machine learning, a feature is an individual measurable property of a phenomenon being observed. Choosing informative, discriminating and independent features is an important hand-crafted step for effective algorithms in pattern recognition, classification and regression. A preliminary step in some conventional applications of machine learning and pattern recognition involves selecting a subset of features, or constructing a new and reduced set of features to facilitate learning and to improve generalization and interpretability. Selecting explicit specific features or explicitly constructing specific features is not, however, carried out in conventional deep-learning systems, such as ANNs. This is because the perceived power of deep-learning systems is to start with raw data and then to construct an end-to-end system that can learn for itself what the optimal features for detection are, starting with the raw data. As such, in conventional deep-learning systems, there is no a priori hand-crafted hard-coding of detectors or filters for specific features.

Various examples will now be described which are able to search and classify images in real-time, for a large and potentially unlimited number of objects with varying size, within video frames and/or without the need to train the system with images containing a particular object with varying sizes. In these examples, a hybrid machine learning system is provided that uses both a hard-coded front end and a neural network back end. Further, the hybrid machine learning system produces more accurate results by compensating for sensor noise of an image sensor used to obtain the image data that is processed in the hybrid machine learning system.

Referring to FIG. 1, there is shown a schematic block diagram of an example of a hybrid machine learning system 100. The hybrid machine learning system 100 uses both a hand-crafted filter sub-system and a deep-learning subsystem. The hybrid machine learning system 100 is for processing image data.

The hybrid machine learning system 100 may be configured to operate as a computer vision system. The computer vision system may for example be an autonomous vehicle computer vision system and/or a robotics computer vision system. The computer vision system may for example be a recognition, detection, interpretation, captioning and/or classification system for an image, human, facial, animal, scene and/or another type of object.

The hybrid machine learning system 100 comprises one or more image sensors 105. An image sensor is a sensor that detects and conveys information that can be used to represent an image. The image sensor(s) 105 may for example comprise one or more charge-coupled devices (CCDs) and/or one or more complementary metal-oxide semiconductor (CMOS) devices.

The one or more image sensors 105 are configured to output image data 110. As such, the image data 110 is obtained from the image sensor(s) 105.

In some known systems, an assumption is made that filters producing a stronger response represent stronger image features. However, image data used in such systems may be products of image processing pipelines, processing the image sensor data with unknown or at least unused settings. Such processing can significantly alter image data compared to the raw sensor data, breaking linear dependencies between parts of an image and unbalancing the appearance of different image elements.

In some examples, the image data 110 may be raw image data. Raw image data is minimally processed data that has been obtained from the image sensor(s) 105. The raw image data may for example be Bayer image data. Alternatively, the image data 110 may have been processed, for example by having been converted into another format, for example RGB. The image data 110 may be comprised in a video frame. The one or more image sensors 105 are configured to output the image data 110 to a front end 115 of the hybrid machine learning system 100. The front end 115 comprises one or more hard-coded filters 120. Each of the one or more hard-coded filters 120 is arranged to perform a set or specific task. The filter(s) 120 may include any hard-coded filter(s) that replicate, approximately or otherwise, the functions performed at the lower levels of conventional CNNs.

As indicated above, a hard-coded filter is one whose values are set or fixed so that the filter performs a set task. The values of the hard-coded filter are not changed through an iterative learning or training process, but instead are set or fixed. The values of the hard-coded filter are not affected by training or learning conducted in the hybrid machine learning system 100.

A conventional CNN may, for example, spend a significant amount of time on converging, at its lower layers, to layers that perform very closely to a Gabor filter. A Gabor filter is a type of filter than can be used for edge detection. As such, features that are learnt and implicitly generated in the early stages of known CNN may instead be explicitly hard-coded or hand-crafted into filters 120 based on previously known features and independent of any training being carried out. Using explicit, hard-coded filters means that information that is known or suspected for the filter(s) 120 to model may be built into the hybrid machine learning system 100 rather than having to be learned during a training phase.

In this example, the front end 115 comprises one or more hard-coded noise compensation filters 120. The set task the one or more hard-coded noise compensation filters 120 are arranged to perform is a noise compensation task. In this example, the one or more hard-coded noise compensation filters 120 are hard-coded to compensate for a noise profile of the image sensor(s) 105 from which the image data 110 is obtained. A conventional CNN cannot readily be programmed to use sensor noise profile information.

Feature extraction may involve filtering image data 100 and normalising the response of the filter. As such, the hybrid machine learning system 100 may normalize a response of the hard-coded noise compensation filter(s) 120 based on, and to take into account, the noise profile of the image sensor(s) 105 from which the image data 110 is obtained.

There may be different types of noise associated with an image sensor. For example, analogue noise, produced by analogue circuits, has a thermal nature and can be approximated by a zero mean Gaussian random process. Analogue noise does not depend on characteristics of light, and is added to the useful image data by analogue sensor components.

Fixed pattern noise may originate from multiplexors and sensor defects and is not a function of time. Sensor defects affect the level of resulting noise associated with an image sensor. Examples of sensor defects found in sensors include, line, column and fixed pattern noise.

Photon noise, also known as a shot noise, may also added to the image data. Photon noise increases as the light level increases due to the increased numbers of photons captured by the sensor.

Taking sensor characteristics, for example a model or profile of the noise of the image sensor(s) 105, into account during edge detection may provide more robust edge detection, which may lead to improved feature or object extraction or detection for example in low light conditions. The model or profile of the noise of the image sensor(s) 105, in all or a defined part of an image, may therefore be used to normalize a feature extraction response by taking into account one or more sensor characteristics.

The noise compensation filter(s) 120 may not necessarily compensate for all noise associated with the image sensor(s) 105, for example they may compensate for only some of the noise. When the noise profile of the image sensor(s) 105 has been analysed, the hard-coded filters may be designed to explicitly compensate for the specific noise profile of the image sensor(s) 105.

As such, the noise profile of the image sensor(s) 105 can be analysed to improve feature extraction, for example providing a reference for edge detection reliability estimation for example. A more robust edge detection method may thereby be provided by taking sensor characteristics into account during edge detection.

GB patent application no. 1422787.0 and international patent application no. PCT/GB2015/054076 describe using a sensor noise profile in more detail and their entire contents are hereby incorporated herein by reference.

The front end 115 may comprise other types of hard-coded filters. Examples of such filters include, but are not limited to, Gabor filters and correlation filters. Examples of correlation filters include, but are not limited to sharpening filters, brightening filters, noise compensation, removal or reduction furthers, texture feature extraction filters, auto-white balance filters, color extraction filters and non-Gabor edge detection filters.

The front end 115 is configured to output data to one or more neural networks 125. The one or more neural networks 125 are arranged to receive and process the output from the front end 115. The neural network(s) 125 may comprise one or more CNNs. The front end 115 may, in effect, replace several of the lower layers of a conventional CNN.

The hybrid machine learning system 100 may be arranged to process the image data 110 in real time. As such, raw image sensor data, where used, may be processed in real time. The hybrid machine learning system 100 may be comprised in a portable device. The portable device may be a smartphone.

As such, the hybrid machine learning system 100 includes a front end 115 comprising one or more filters, namely the hard-coded noise compensation filter(s) 120. In some examples described in more detail below, the front end 115 may additionally or alternatively comprise one or more operators, for example one or more segmentation operators. The one or more filters and/or one or more operators are each explicitly defined to perform a set task and are not the result of an iterative learning process, such as that seen in known CNNs. The output or outputs of the front end 115 are fed to and are processed by the neural network(s) 125, which may comprise one or more CNNs. Hence, the filter(s) and/or operator(s) are not programmable or adaptable, but are hard-coded. They are therefore unlike the convolutional kernels used in known typical CNNs which, through an iterative training process, have their parameters adjusted or adapted so that, after training, they eventually trigger for specific features like edges and corners in an image.

The hybrid machine learning system 100 is also different from simply adding a pre-trained front end of layers to a known ANN, for example a CNN. The layers in the pre-trained front end would, at one time, have been conventional, programmable or adaptable layers and therefore not hard-coded or hand-crafted. The hard-coded filter(s) and/or operator(s) described herein differ from pre-trained CNN layers in that mathematical modelling of the hard-coded filter(s) and/or operator(s) may be used to select fully orthogonal basis functions that may be used to represent the information in the image data 110 in the most compact and efficient form.

As also indicated above, hard-coded filter(s) and/or operator(s) described herein allow their responses to be weighted according to the noise profile of the image sensor(s) 105, for example taking into account a signal-to-noise ratio based on characterization of the image sensor(s) 105. Such behaviour cannot be learned by a known CNN. As such, the filter(s) and/or operator(s) are hand-crafted or hard-coded to use the image sensor noise profile data.

A hybrid machine learning system 100 is provided that, in effect, bypasses the initial convolutional stages present in known CNNs and instead replaces the initial stage with a specific choice of one or more hand-crafted filters, which may include one or more Gabor filters and/or one or more correlation filters.

As such the machine learning system 100 can be seen as a hybrid system, combining aspects from two conventionally separate and distinct areas of computer vision, namely combining feature extraction using one or more hard-coded filters and/or one or more hard-coded operators that perform tasks that a known CNN would eventually, after training, learn how to perform together with aspects of a known CNN that activates when higher-level features are present in an image.

Many of the lower-end layers of a known CNN may in effect be eliminated, so the overall structure of the machine learning system is more compact than in known CNNs. The remaining layers of the CNN take, as their input, image data that has already been subject to significant relevant interpretation and processing in the front end 115 and can therefore more efficiently learn to activate, or be trained to recognize, specific types of items or instances of those items.

The hybrid machine learning system 100 subverts the one of the key assumptions of conventional deep-learning systems, which is that they should take raw data as input and entirely avoid hand-crafted or hard-coded feature engineering.

The hybrid machine learning system 100 results in a reduction of the number of neurons as compared to known CNNs as the front end 115 does not include convolution kernels. The hybrid machine learning system 100 instead provides clear initial state, producing results equivalent to a linear classifier, making further training more predictable and faster.

Figure 2:
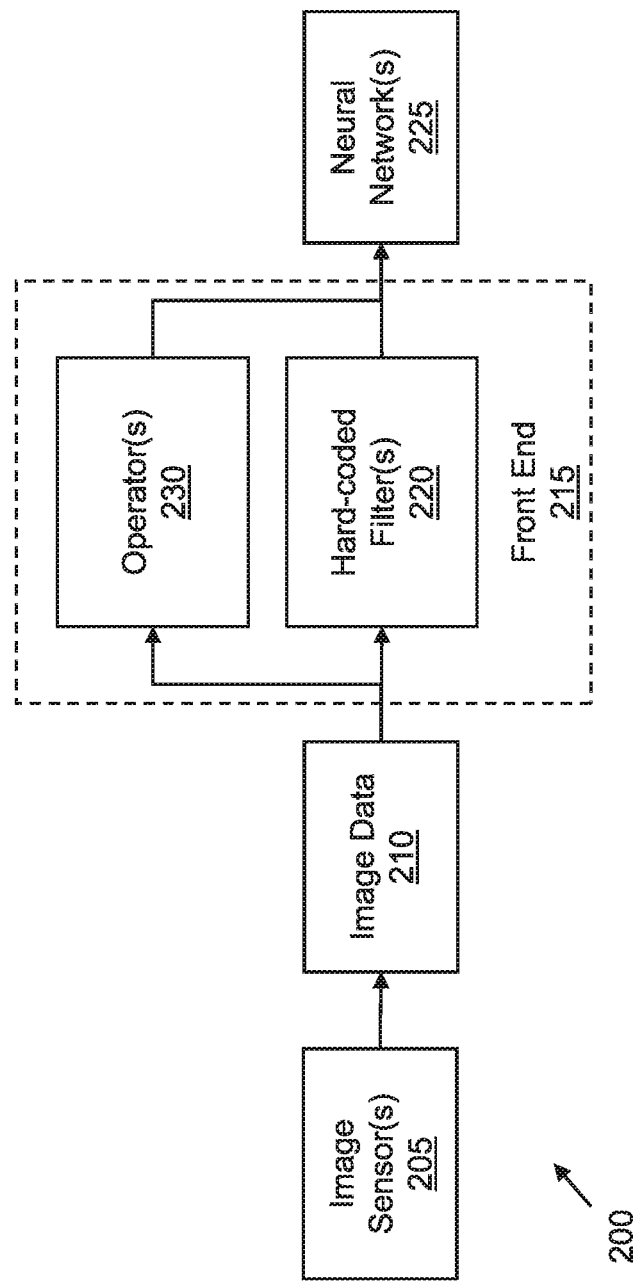
FIG. 2 shows a schematic block diagram of another example of hybrid machine learning system, in accordance with some example embodiments.

Referring to FIG. 2, there is shown a schematic block diagram of an example of a hybrid machine learning system 200. The hybrid machine learning system 200 shown in FIG. 2 includes numerous components that are the same as or are similar to corresponding components of the hybrid machine learning system 100 shown in FIG. 1 and described above. Such components are indicated in FIG. 2 using the same reference numeral as that of the corresponding component in FIG. 1, but incremented by 100. In this example, the front end 215 of the hybrid machine learning system 200 comprises one or more operators 230.

The one or more operators 230 may include one or more segmentation operators. A segmentation operator partitions an image into several non-overlapping regions, each of which is homogeneous in one or more features and maximal in terms of such homogeneity. A method of object segmentation may be used that creates a template of the object that is separated from the image background. The segmentation method begins by selecting starting points and by using an algorithm to find similar pixels around the initial starting points. The algorithm continues to find other similar pixels until it eventually reaches an edge or boundary and stops. Each starting point evolves into multiple hypotheses layers that form parts of the object. The multiple hypotheses from each starting point are then combined to create a template of the overall contour of the object. The segmentation method is less size-dependent than a CNN performing segmentation. The segmentation method is also more resilient to the object being deformed. The entire set of multiple hypotheses resulting from the segmentation method may be used.

This example therefore provides a combination of one or more hard-coded filters 220 and one or more segmentation operators 230 arranged to implement one or more segmentation techniques at the front end 215 of one or more neural networks 225.

The one or more hard-coded filters 220 and the one or more operators 230 (for example one or more segmentation operators) may be combined in the feature-engineered front end 215 in this way on a number of size scales because they are uncorrelated processes. The filter(s) 220 and operator(s) 230 are uncorrelated, and those calculated on different scales are also weakly correlated. The combined results are then fed into the neural network(s) 225 for extraction of, or activation by, higher level features or concepts.

In known CNNs, a number of layers are trained to provide scale invariance. The architecture described above forms a simpler network than that of known CNNs, but with a comparable performance. In addition, it features significant scale invariance. Because it has fewer layers than a known CNN of comparable performance, it is also less computationally intensive to implement. It is also more efficient to implement in a real-time system, including a hardware-based system, such as a SoC, that can run on a power-constrained device such as a smartphone. The complexity reduction enables online learning functionality, as the hybrid machine learning system can access the required number of images in real time and can learn a new object in a real time. In particular, the dimensionality reduction provided by the use of hand-crafted features reduces the number of CNN parameters by a factor of 5-10. This makes training of the neural network(s) faster, and reduces the number of images required to train the neural network(s).

In terms of training initialisation, the hard-coded front-end stage gives an initial response with a reasonable initial probability rate, which in turns lead into convergence towards a solution more efficiently.

Training of the hybrid machine learning system 200 may start from preparation of a training dataset. The images, contained in the training set, are passed through the hand-crafted input filter(s) 220 and/or operator(s) 230 to create a dataset for training the neural network(s) 225. Further, the neural network(s) 225 part of the hybrid machine learning system 200 is trained on a pre-calculated dataset using a known traditional stochastic back-propagation method. Training of the neural network(s) 225 is performed using a back-propagation method which is more efficient than training a known neural network as the hybrid machine learning system 200 already knows an initial useful solution. In contrast, training a traditional CNN is completely random and involves a large number of parameters with a large dimensional space.

Using pre-calculated CNN data input allows a linear classifier to be built using linear regression, Fisher linear discriminant, or support vector machine (SVM) to find a solution for classification. The obtained solution can be translated into a CNN initial state, which would allow the CNN part 225 of the hybrid machine learning system 220 to be trained more quickly.

By using the results of a combination of one or more filters 220 and a segmentation method, the hybrid machine learning system 220 can be pre-initialised with a better starting point, in comparison to a CNN, in order to effectively look for an object of interest. The number of neurons and the size of the linear layers in the neural network(s) 225 are thereby decreased.

In this example, the front end 215 includes one or more filters 220 as defined above, for example it may comprise one or more Gabor filters in addition to the hard-coded noise compensation filter(s), and one or more operators 230, for example one or more segmentation operators. The filter(s) 220 and/or operator(s) 230 may be chosen to form a complete, orthogonal basis for representing the image data 210. In particular, the one or more filters 220 and/or operator(s) 230 may be chosen to represent the image data 210 fully, allowing lossless reconstruction of the image data 210 from a filter-operator representation. There are various different bases that can be used to encode or represent the image data 210, for example Fourier, Wavelet and Gabor, so it can be reversed back into image, or another original, form. Orthogonal bases represent the information with minimal loss, and its characteristics can be investigated using mathematical methods. Orthogonal bases do not necessarily represent data in the best form for machine learning process, such as SVM, for example. However, a Gabor representation can be coupled with neural networks, for example CNNs, successfully, especially taking into account the ability to use sensor characterization data as described above.

A segmentation method may be used independently of the filter(s) 220 but in conjunction with a neural network model. The segmentation method may be used for feature extraction as a front end for image classification. Image classification may then take place in the neural network(s) 225. Methods have been developed to find and understand polygons which in turn form the patterns that linear classifiers need to understand. Methods have been developed to define the features that linear classifier(s) may use to identify an object. The entire set of intermediate hypotheses resulting from the segmentation method that contains information about the object(s) in the image may be kept and used for classification. Overlaps between regions may be used and propagated effectively. The segmentation may effectively generate any shape, which results in a flexible network.

Figure 3:
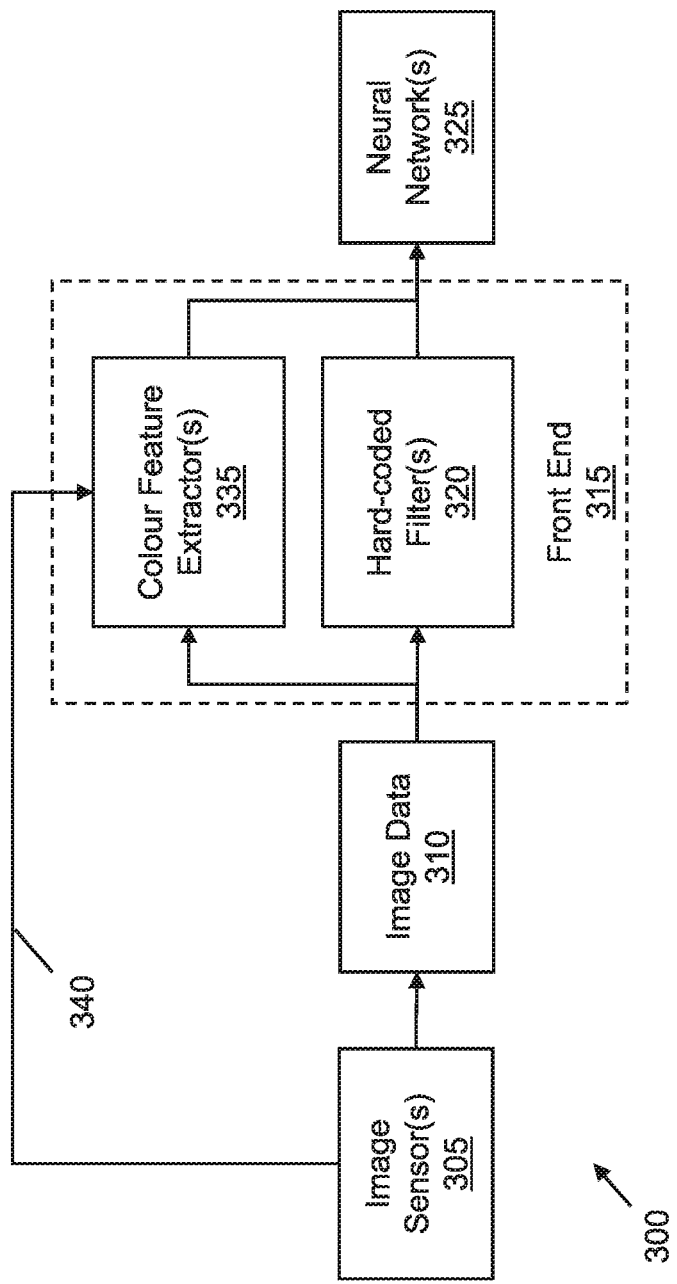
FIG. 3 shows a schematic block diagram of another example of hybrid machine learning system, in accordance with some example embodiments.

Referring to FIG. 3, there is shown a schematic block diagram of an example of a hybrid machine learning system 300. The hybrid machine learning system 300 shown in FIG. 3 includes numerous components that are the same as or are similar to corresponding components of the hybrid machine learning system 100 shown in FIG. 1 and described above. Such components are indicated in FIG. 3 using the same reference numeral as that of the corresponding component in FIG. 1, but incremented by 200. The hybrid machine learning system 300 may comprise one or more other components, for example one or more operators.

It can be difficult to detect specific colors in machine learning systems. For example, it can be challenging to detect a blue dress as opposed to a red dress. There are a number of known approaches to detecting correct visual colors.

One known approach involves measuring pixels statistics, and using an auto-white balance (AWB) algorithm to try to estimate the light source. A color correction matrix is programmed and applied to the pixels in order to get white balance (WB)-corrected pixels. A limitation of this approach arises when the original colors are close to the limit of the number of bits that can be represented. In this case, clipping occurs and information is lost, in particular at the edges. A bright red object might for example end up becoming pinkish, while a blue color might become a sky pale color.

Another known approach is to implement a color-correction algorithm embedded within a camera engine such that it is possible to manipulate the pixel stream and correct for color variation for various different setups, for example for indoors as well as outdoors applications. This may however lead to clipping of the color gamut, where pixel information that could have been used is lost. As an example, high dynamic range (HDR) cameras used in automotive applications may manipulate an image to avoid clipping. The image may be underexposed by a factor of three, reducing the image gamut. Clipping may be avoided but the image is significantly darker than the original image.

Since color information could still be lost even if colors are corrected before the filter(s) or operators(s) described above, a feature extraction layer used for true color extraction is provided in the hybrid machine learning system 300.

In this example, the front end 315 of the hybrid machine learning system 300 comprises one or more color feature extractors 335. The hybrid machine learning system 300 is configured to provide one or more input pixel streams 340 from the image sensor(s) 305 to the color feature extractor(s) 335, directly from the image sensor(s) 305.

The color feature extractor(s) 335 may convert the input pixels obtained via the input pixel stream(s) 340 into YUV color space components without clipping. The YUV colorspace encodes a color image taking human perception into account. The YUV colorspace defines a color in terms of luminance (Y), which relates to brightness, and chrominance (UV), which relates to the color component. Use of YUV may be beneficial, compared to RGB, where it is desired to mask transmission errors or compression artefacts from human perception.

The color feature extractor(s) 335 may convert the input pixels obtained via the input pixel stream(s) 340 into HSV color space components, namely hue, saturation and value. HSV uses a different geometry (cylindrical coordinate) from that associated with RGB (Cartesian). Hue is the shade of a color, saturation relates to how pure or sharp the colors is and value is the lightness or darkness of the color. The HSV components may be derived from RGB values. The hue and saturation components may be extracted from the input pixel stream(s) 340 using a transformation saturation method. Use of HSV may be beneficial, compared to RGB or YUV, where detecting a particular color is sought.

Further, the YUV and HSV gamuts are wider than that of RGB so, for example, RGB to YUV conversion may fully define the original RGB space. However, manipulation within the YUV space may produce data that cannot be mapped back into RGB form.

The color feature extraction algorithm may be embedded inside a camera engine and make use of the linear, raw data directly from the image sensor. As such, an additional color feature extractor layer can be added in the front end 315.

Figure 4:
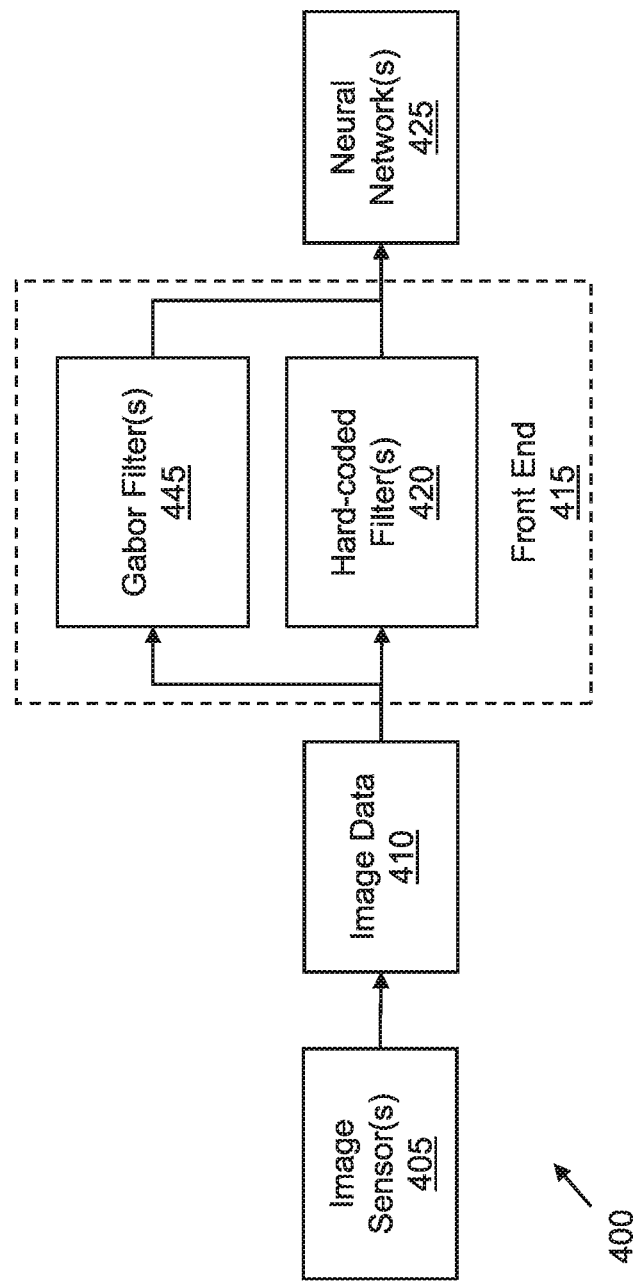
FIG. 4 shows a schematic block diagram of another example of hybrid machine learning system, in accordance with some example embodiments.

Referring to FIG. 4, there is shown a schematic block diagram of an example of a hybrid machine learning system 400. The hybrid machine learning system 400 shown in FIG. 4 includes numerous components that are the same as or are similar to corresponding components of the hybrid machine learning system 100 shown in FIG. 1 and described above. Such components are indicated in FIG. 4 using the same reference numeral as that of the corresponding component in FIG. 1, but incremented by 300. The hybrid machine learning system 400 may comprise one or more other components, for example one or more operators and/or one or more color feature extractors. In this example, the front end 415 of the hybrid machine learning system 400 comprises one or more Gabor filters 445.

Figure 5:
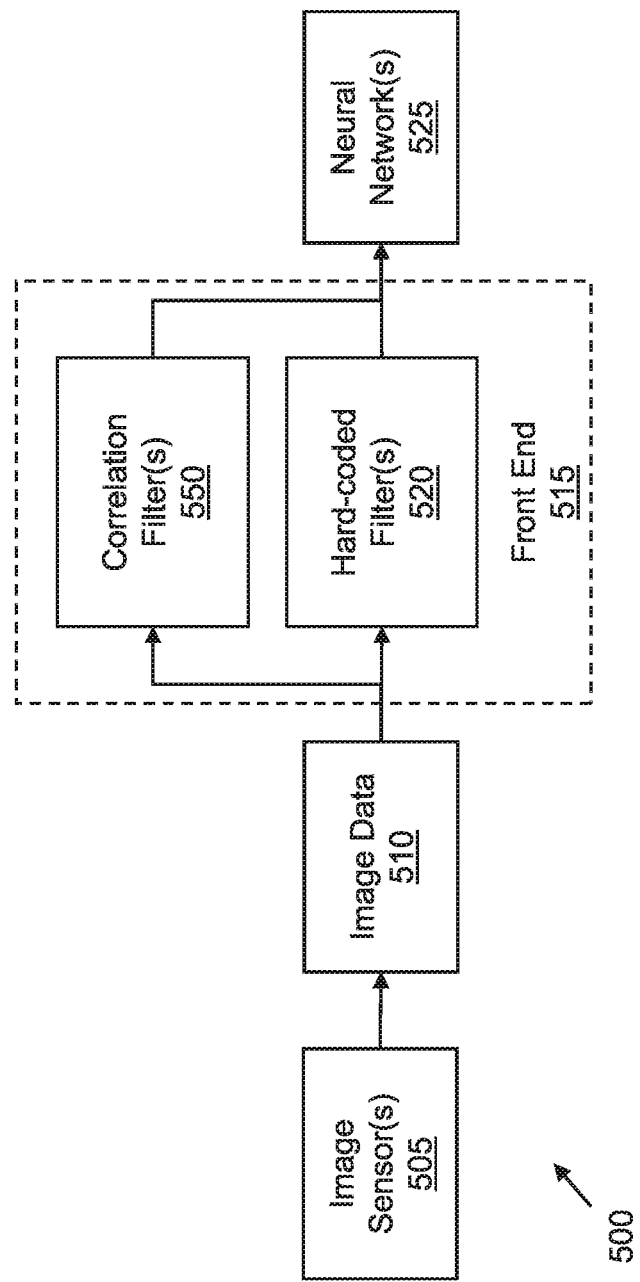
FIG. 5 shows a schematic block diagram of another example of hybrid machine learning system, in accordance with some example embodiments.

Referring to FIG. 5, there is shown a schematic block diagram of an example of a hybrid machine learning system 500. The hybrid machine learning system 500 shown in FIG. 5 includes numerous components that are the same as or are similar to corresponding components of the hybrid machine learning system 100 shown in FIG. 1 and described above. Such components are indicated in FIG. 5 using the same reference numeral as that of the corresponding component in FIG. 1, but incremented by 400. The hybrid machine learning system 300 may comprise one or more other components, for example one or more operators and/or one or more color feature extractors and/or one or more Gabor filters.

In this example, the front end 515 of the hybrid machine learning system 500 comprises one or more correlation filters 550. The one or more correlation filters 550 may comprise one or more sharpening filters. The one or more correlation filters 550 may comprise one or more brightening filters. The one or more correlation filters 550 may comprise one or more edge detection filters. The one or more correlation filters 550 may comprise one or more texture feature extraction filters. The one or more correlation filters 550 may comprise one or more further noise compensation filters.

Figure 6:
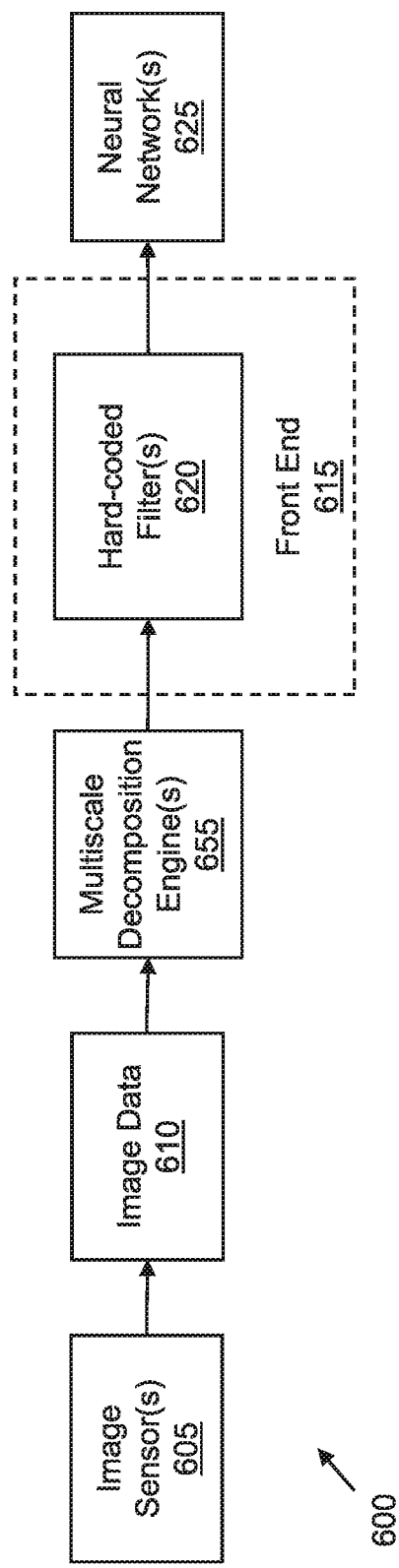
FIG. 6 shows a schematic block diagram of another example of hybrid machine learning system, in accordance with some example embodiments.

Referring to FIG. 6, there is shown a schematic block diagram of an example of a hybrid machine learning system 600. The hybrid machine learning system 600 shown in FIG. 6 includes numerous components that are the same as or are similar to corresponding components of the hybrid machine learning system 100 shown in FIG. 1 and described above. Such components are indicated in FIG. 6 using the same reference numeral as that of the corresponding component in FIG. 1, but incremented by 500. The hybrid machine learning system 300 may comprise one or more other components, for example one or more operators and/or one or more color feature extractors and/or one or more Gabor filters and/or one or more convolution filters.

In this example, the hybrid machine learning system 600 comprises one or more multiscale decomposition engines 655. A multiscale decomposition engine is an efficient hardware engine that may decompose image data into multiple different levels, or scales, and search a window around an image with many different size scales. Each of the different levels, or scales, corresponds to a different resolution. The multiscale decomposition engine(s) 655 is arranged to receive the image data 610 from the image sensor 605 and to output data to the front end 615. The image data 610 may be raw image data. The multiscale decomposition engine(s) 655 may be coarse multiscale decomposition engine(s) in that the resolution of the image subject to decomposition is relatively low.

Figure 7:
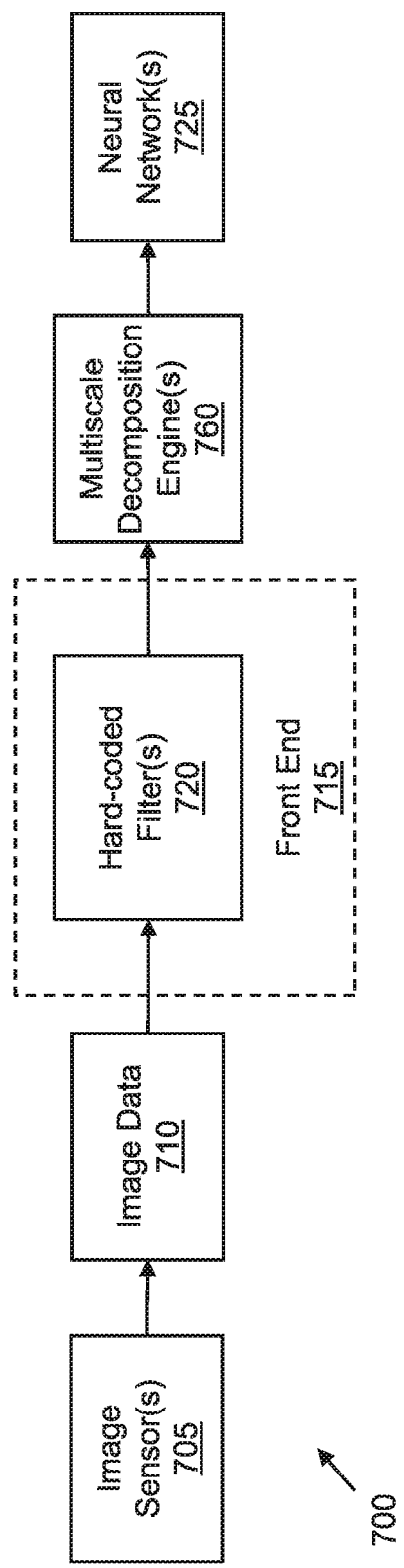
FIG. 7 shows a schematic block diagram of another example of hybrid machine learning system, in accordance with some example embodiments.

Referring to FIG. 7, there is shown a schematic block diagram of an example of a hybrid machine learning system 700. The hybrid machine learning system 700 shown in FIG. 7 includes numerous components that are the same as or are similar to corresponding components of the hybrid machine learning system 100 shown in FIG. 1 and described above. Such components are indicated in FIG. 7 using the same reference numeral as that of the corresponding component in FIG. 1, but incremented by 600. The hybrid machine learning system 300 may comprise one or more other components, for example one or more operators and/or one or more color feature extractors and/or one or more Gabor filters and/or one or more convolution filters and/or one or more other multiscale decomposition engines.

In this example, the hybrid machine learning system 700 comprises one or more multiscale decomposition engines 760 arranged to receive data from the front end 715. In this example, the one or more multiscale decomposition engines 760 are arranged to output data to the neural network 725. In some examples, each of the one or more filters and/or one or more operators in the front end are arranged to output features to the multiscale decomposition engine(s). The multiscale decomposition engine(s) 760 may be a detailed (or 'fine') multiscale decomposition engine(s) in that the resolution of the image subject to decomposition is relatively high.

The outputs from some or all of the one or more hard-coded filters 720 and/or the one or more operators may be sent to the multi-scale decomposition engine(s) 760. The outputs from the multi-scale engine(s) 760 are then further combined and are sent to the neural network(s) 725. In particular, at each layer, partial sums are calculated and passed through the neurons in the neural network(s) 725. Cross dependence between the neurons are calculated and spatial dependences are provided. The results are then combined with various weights. The process is repeated many times.

Figure 8:
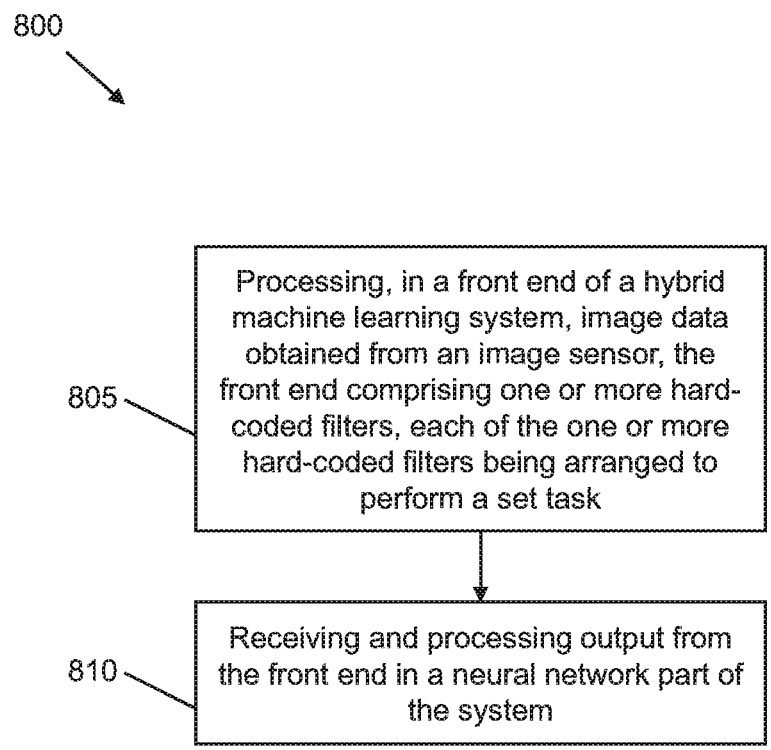
FIG. 8 shows a flowchart illustrating an example of a method, in accordance with some example embodiments.

Referring to FIG. 8, there is shown an example of a method 800 of processing image data. The method is performed in a hybrid machine learning system. At item 805, image data obtained from an image sensor is processed in a front end of the hybrid machine learning system. The front end of the hybrid machine learning system comprises one or more hard-coded filters. Each of the one or more hard-coded filters is arranged to perform a set task. The one or more hard-coded filters include a hard-coded noise compensation filter that is hard-coded to compensate for a noise profile of the image sensor from which the image data is obtained. At item 810, output from the front end is received and processed in a neural network part of the hybrid machine learning system.

Figure 9:
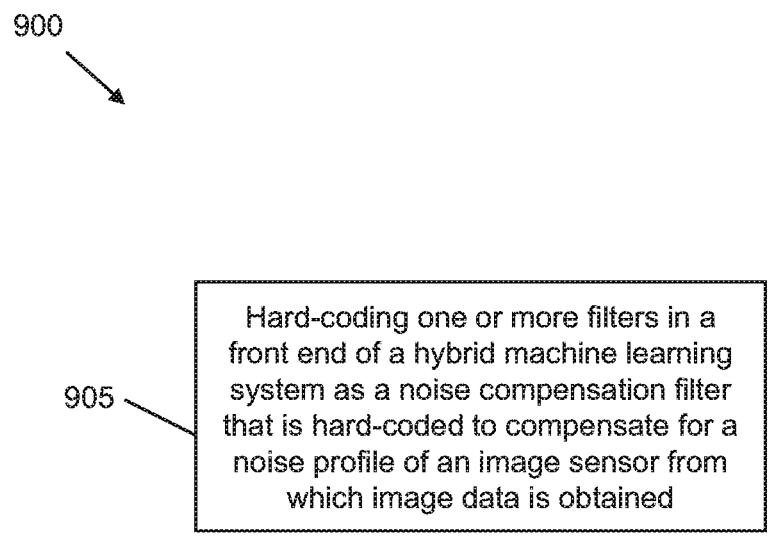
FIG. 9 shows a flowchart illustrating another example of a method, in accordance with some example embodiments.

Referring to FIG. 9, there is shown an example of a method 900 of configuring a hybrid machine learning system for processing image data obtained from an image sensor. The hybrid machine learning system comprises a front end comprising one or more filters and a neural network configured to receive and process output from the front end. At item 905, one or more of the filters is hard-coded as a noise compensation filter that is hard-coded to compensate for a noise profile of the image sensor from which the image data is obtained.

Various measures (for example hybrid machine learning systems, methods and computer software) are provided for processing image data obtained from an image sensor in a hybrid machine learning system. The system comprises a front end comprising one or more hard-coded filters. Each of the one or more hard-coded filters is arranged to perform a set task. The system also comprises a neural network arranged to receive and process output from the front end. The one or more hard-coded filters include one or more hard-coded noise compensation filters that are hard-coded to compensate for a noise profile of the image sensor from which the image data is obtained.

The front end may comprise one or more segmentation operators. The front end may comprise one or more color feature extractors. The hybrid machine learning system may be configured to provide input pixels obtained from the image sensor to the one or more color feature extractors via one or more input pixel streams. The color feature extractor(s) may be configured to convert the input pixels in the one or more input pixel streams into YUV color space components without clipping. The color feature extractor(s) may be configured to extract a hue saturation component from the one or more input pixel streams. The front end may comprise one or more Gabor filters. The front end may comprise one or more correlation filters. The one or more correlation filters may include one or more sharpening filters, one or more brightening filters, one or more edge detection filters, one or more texture feature extraction filters one or more auto-white balance filters, one or more color extraction filters and/or one or more further noise compensation filters.

The hybrid machine learning system may comprise one or more multiscale decomposition engines arranged to receive the image data from the image sensor and to output data to the front end. The hybrid machine learning system may comprise one or more multiscale decomposition engines arranged to receive data from the front end. The one or more multiscale decomposition engines arranged to receive data from the front end may be arranged to output data to the neural network. The image data may be raw image data. The image data may be comprised in a video frame. The hybrid machine learning system may be arranged to process the image data in real time. The neural network may be a CNN. The hybrid machine learning system may be in a portable device. The portable device may be a smartphone. The hybrid machine learning system may be configured to operate as a computer vision system. The computer vision system may comprise an image recognition system. The computer vision system may comprise a facial recognition system. The hybrid machine learning system may be configured to operate as a classification and captioning system. The system may be arranged to normalize a response of the one or more hard-coded noise compensation filters based on the noise profile of the image sensor from which the image data is obtained.

Various measures (for example hybrid machine learning systems, methods and computer software) are provided for processing image data in a hybrid machine learning system. Image data obtained from an image sensor is processed in a front end of the hybrid machine learning system. The front end comprises one or more hard-coded filters. Each of the one or more hard-coded filters is arranged to perform a set task. Output from the front end is received and processed in a neural network part of the hybrid machine learning system. The one or more hard-coded filters include a hard-coded noise compensation filter that is hard-coded to compensate for a noise profile of the image sensor from which the image data is obtained.

Various measures (for example hybrid machine learning systems, methods and computer software) are provided for configuring a hybrid machine learning system for processing image data obtained from an image sensor. The hybrid machine learning system comprises a front end comprising one or more filters and a neural network configured to receive and process output from the front end. One or more of the filters is hard-coded as a noise compensation filter that is hard-coded to compensate for a noise profile of the image sensor from which the image data is obtained.

Various measures (for example systems, methods and computer software) are provided for processing image data in a system. The system comprises a front end comprising one or more hard-coded filters adapted to compensate for sensor noise associated with one or more image sensors from which the image data is obtained and a back end comprising one or more neural networks adapted to receive and process output from the front end.

The above embodiments are to be understood as illustrative examples. Further embodiments are envisaged.

In the examples described above, classification is performed in the neural network(s). In other examples, the hybrid machine learning system comprises one or more linear classifiers arranged to receive output from the front end, perform classification, and output to the neural network(s). In some such examples, one or more multiscale decomposition engines may feed into the linear classifier(s). In some examples, the linear classifier(s) feed into one or more CNNs.

Various measures (for example hybrid machine learning systems, methods and computer software) are described above for processing image data obtained from an image sensor in a hybrid machine learning system. The system comprises a front end comprising one or more hard-coded filters. Each of the one or more hard-coded filters is arranged to perform a set task. The system also comprises a neural network arranged to receive and process output from the front end.

In the examples described above, the front end comprises one or more hard-coded noise compensation filters that are hard-coded to compensate for a noise profile of the image sensor from which the image data is obtained.

In other examples, the front end does not include one or more such hard-coded noise compensation filters. In such other examples, the system may comprise one or more segmentation operators and/or one or more color feature extractors and/or or one or more Gabor filters and/or one or more correlation filters as described above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A machine learning system for processing image data obtained from an image sensor, the machine learning system comprising:
 a front end comprising one or more hard-coded segmentation operators to partition an image into a plurality of non-overlapping regions, and one or more hard-coded filters, each of the one or more hard-coded filters being arranged to perform a set task; and
 a neural network arranged to receive and process output from the front end,
 wherein the one or more hard-coded filters include one or more hard-coded non-adaptive noise compensation filters that are hard-coded to compensate for a noise profile of the image sensor from which the image data is obtained, and wherein the machine learning system is arranged to normalize a response of the one or more hard-coded non-adaptive noise compensation filters based on the noise profile of the image sensor from which the image data is obtained.

2. The machine learning system according to claim 1, wherein the front end comprises one or more color feature extractors.

3. The machine learning system according to claim 2, the machine learning system being configured to provide input pixels obtained from the image sensor to the one or more color feature extractors via one or more input pixel streams.

4. The machine learning system according to claim 3, the one or more color feature extractors being configured to convert the input pixels in the one or more input pixel streams into YUV color space components without clipping.

5. The machine learning system according to claim 3, the one or more color feature extractors being configured to extract hue and saturation components from the one or more input pixel streams.

6. The machine learning system according to claim 1, wherein the front end comprises one or more Gabor filters.

7. The machine learning system according to claim 1, wherein the front end comprises one or more correlation filters.

8. The machine learning system according to claim 7, wherein the one or more correlation filters include one or more sharpening filters, one or more brightening filters, one or more edge detection filters, one or more texture feature extraction filters, one or more auto-white balance filters, one or more color extraction filters, and/or one or more further noise compensation filters.

9. The machine learning system according to claim 1, comprising one or more multiscale decomposition engines arranged to receive the image data from the image sensor and to output data to the front end.

10. The machine learning system according to claim 1, comprising one or more multiscale decomposition engines arranged to receive data from the front end.

11. The machine learning system according to claim 10, wherein the one or more multiscale decomposition engines arranged to receive data from the front end are arranged to output data to the neural network.

12. The machine learning system according to claim 1, wherein the image data is raw image data.

13. The machine learning system according to claim 1, wherein the machine learning system is arranged to process the image data in real time.

14. The machine learning system according to claim 1, wherein the neural network is a convolutional neural network.

15. The machine learning system according to claim 1, wherein the machine learning system comprises at least one of: an image recognition system or a facial recognition system.

16. The machine learning system according to claim 1, wherein the machine learning system is configured to operate as a classification and captioning system.

17. The machine learning system according to claim 1, wherein each of the plurality of non-overlapping regions are homogeneous in one or more image features.

18. A method of processing image data in a machine learning system, the method comprising:
   processing, in a front end of the machine learning system, image data obtained from an image sensor, the front end comprising one or more hard-coded segmentation operators to partition an image into a plurality of non-overlapping regions, and one or more hard-coded filters, each of the one or more hard-coded filters being arranged to perform a set task, wherein the one or more hard-coded filters include a hard-coded non-adaptive noise compensation filter that is hard-coded to compensate for a noise profile of the image sensor from which the image data is obtained;
   normalizing a response of the hard-coded non-adaptive noise compensation filter based on the noise profile of the image sensor from which the image data is obtained; and
   receiving and processing output from the front end in a neural network part of the machine learning system.

19. A system for processing image data, the system comprising:
   a front end comprising one or more hard-coded segmentation operators to partition an image into a plurality of non-overlapping regions, and one or more hard-coded non-adaptive filters hard-coded to compensate for a noise profile of one or more image sensors from which the image data is obtained, wherein the system is arranged to normalize a response of the one or more hard-coded non-adaptive filters based on the noise profile; and
   a back end comprising one or more neural networks adapted to receive and process output from the front end.

* * * * *